(12) United States Patent
Chen et al.

(10) Patent No.: US 11,159,934 B2
(45) Date of Patent: Oct. 26, 2021

(54) PRESENCE REPORTING AREAS FOR THE UE

(71) Applicant: Telefonaktiebolaget LM Ericsson (publ), Stockholm (SE)

(72) Inventors: Qian Chen, Mölndal (SE); Peter Hedman, Helsingborg (SE); Josefin Karlsson, Torslanda (SE); Peter Ramle, Mölnlycke (SE); Stefan Rommer, Västra Frölunda (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/621,738

(22) PCT Filed: Jun. 21, 2018

(86) PCT No.: PCT/EP2018/066677
§ 371 (c)(1),
(2) Date: Dec. 12, 2019

(87) PCT Pub. No.: WO2018/234511
PCT Pub. Date: Dec. 27, 2018

(65) Prior Publication Data
US 2020/0107182 A1  Apr. 2, 2020

Related U.S. Application Data

(60) Provisional application No. 62/523,420, filed on Jun. 22, 2017.

(51) Int. Cl.
*H04W 8/14* (2009.01)
*H04W 48/12* (2009.01)
(Continued)

(52) U.S. Cl.
CPC ............. *H04W 8/14* (2013.01); *H04W 48/12* (2013.01); *H04W 48/16* (2013.01); *H04W 60/04* (2013.01)

(58) Field of Classification Search
CPC ..... H04W 76/30; H04W 60/04; H04W 48/12; H04W 8/14; H04W 48/16; H04W 60/00
See application file for complete search history.

(56) References Cited

U.S. PATENT DOCUMENTS

2010/0255840 A1    10/2010  Itamiya et al.
2013/0337797 A1    12/2013  Ban et al.
2021/0029778 A1*   1/2021   Talebi Fard .......... H04W 76/12

OTHER PUBLICATIONS

3rd Generation Partnership Project, "3rd Generation Partnership Project; Technical Specification Group Services and System Aspects; Study on Architecture for Next Generation System (Release 14)", Technical Specification, 3GPP TR 23.799 V14.0.0, Dec. 1, 2016, pp. 1-522, 3GPP.

(Continued)

*Primary Examiner* — Diane D Mizrahi
(74) *Attorney, Agent, or Firm* — Coats & Bennett, PLLC

(57) ABSTRACT

An Access and Mobility Management Function (AMF) provides the UE with a UE Reporting Area, URA. The URA is a sub-area of the Reporting Area, RA and is defined by a set of cells, gNBs or traffic area identifiers, TAIs, or a combination of them. The UE sends a notification to the AMF when it crosses the border of URA. The AMF determines the URA by retrieving or determining a RA for the UE, retrieving a PRA of the UE, and determining the URA in dependence on the RA and PRA.

4 Claims, 11 Drawing Sheets

(51) Int. Cl.
*H04W 48/16* (2009.01)
*H04W 60/04* (2009.01)

(56) References Cited

OTHER PUBLICATIONS

3rd Generation Partnership Project, "3rd Generation Partnership Project; Technical Specification Group Services and System Aspects; System Architecture for the 5G System; Stage 2 (Release 15)", Technical Specification, 3GPP TS 23.501 V0.4.0, Apr. 1, 2017, pp. 1-124, 3GPP.

3rd Generation Partnership Project, "3rd Generation Partnership Project; Technical Specification Group Services and System Aspects; Procedures for the 5G System; Stage 2 (Release 15)", Technical Specification, 3GPP TS 21502 V0.3.0, Mar. 1, 2017, pp. 1-115, 3GPP.

Ericsson, "TS 23.502: Improvements of MM Procedures with UPF Change", SA WG2 Meeting #121, Hangzhou, CN, May 15, 2017, pp. 1-16, S2-172990, 3GPP.

Ericsson et al., "TS 23.502: Improvements of MM Procedure with UPF Change", SA WG2 Meeting #121, Hangzhou, CN, May 15, 2017, pp. 1-17, S2-173839, 3GPP.

Huawei et al., "TS 23.501: Mobility Area Change Event Subscription", 3GPP TSG SA WG2 Meeting #121, Hangzhou, CN, May 15, 2017, pp. 1-3, S2-173136, 3GPP.

Huawei et al., "TS 23.501: Mobility Area Change Event Subscription", 3GPP TSG SA WG2 Meeting #121, Hangzhou, CN, May 15, 2017, pp. 1-3, S2-174042, 3GPP.

Huawei et al., "TS 23.501: Mobility Area Change Event Subscription", 3GPP TSG SA WG2 Meeting #121, Hangzhou, CN, May 15, 2017, pp. 1-3, S2-173884, 3GPP.

3rd Generation Partnership Project, "3rd Generation Partnership Project; Technical Specification Group Services and System Aspects; System Architecture for the 5G System; Stage 2 (Release 15)", Technical Specification, 3GPP TS 23.501 V0.5.0, May 1, 2017, pp. 1-145, 3GPP.

3rd Generation Partnership Project, "3rd Generation Partnership Project; Technical Specification Group Core Network and Terminals; Non-Access-Stratum (NAS) Protocol for Evolved Packet System (EPS); Stage 3 (Release 14)", Technical Specification, 3GPP TS 24.301 V14.4.0, Jun. 1, 2017, pp. 1-486, 3GPP.

Ericsson et al., "TS 23.502: Improvements of MM Procedure with UPF Change", SA WG2 Meeting #121, Hangzhou, CN, May 15, 2017, pp. 1-19, S2-173839, 3GPP.

ETSI, "Network Functions Virtualisation (NFV); Architectural Framework", Group Specification, ETSI GS NFV 002 V1.1.1, Oct. 1, 2013, pp. 1-21, ETSI.

\* cited by examiner

PRESENCE REPORTING AREAS FOR THE UE

TECHNICAL FIELD

This invention is directed to methods and apparatus for registering user entities before network entities in a mobile communication network. More particularly, aspects of the invention relate to registration procedures and concepts for Next Gen, next generation, mobile communication standard based systems.

BACKGROUND

In the 5G work in 3GPP a split between Mobility Management (MM) and Session Management (SM) has been defined compared to in EPC (Evolved Packet Core) where MME supports both MM and some SM functionality. The Access Mobility management Function, here also denoted Access and Mobility Function (AMF), supports MM (Mobility Management) functionality and the Session Management Function (SMF) supports SM (Session management) functionality. The AMF selects the SMF. Different SMFs may be selected for different PDU Sessions of a UE, e.g. PDU Sessions to different Data Network Names (DNNs)/Access Point Names (APNs), or the same SMF may be used. The agreed reference architecture is shown in the FIG. 1, which corresponds to TS 23.501 V0.5.0 (2017-05), FIG. 4.2.3-3, Applying non-roaming 5G System architecture for multiple PDU session in reference point representation.

Connection management comprises the functions of establishing and releasing a signalling connection between a UE and the AMF over the N1 interface. This signalling connection is used to enable NAS signalling exchange between the UE and the core network. It comprises both the AN signalling connection between the UE and the AN (e.g. Radio Resource Connection, RRC, connection over 3GPP access) and the N2 connection for this UE between the AN and the AMF. Two CM (Connection Management) states are used to reflect the NAS (Non-Access Stratum) signalling connectivity of the UE with the AMF are CM-IDLE and CM-CONNECTED. A UE in CM-IDLE state is in RM-REGISTERED state (c.f. TS 23.501, 5.3.2) and has no NAS signalling connection established with the AMF over N1. The UE performs cell selection, cell reselection and PLMN (Public Land Mobile Network) selection. A UE in CM-CONNECTED state has a NAS signalling connection with the AMF over N1. Connection management is discussed in 3GPP TS 23.501 V0.5.0 (2017-05), 5.3.3.

RRC (Radio Resource Control) connection states:
RRC idle (whenever the AN signalling connection is released);
RRC Inactive state (A UE in CM-CONNECTED state can be in RRC Inactive state, UE reachability (paging) is managed by the RAN (Radio Access Node), with assistance information from core network; UE monitors for paging with UE's CN and RAN identity);
RRC-Connected.

As part of the 5G work in 3GPP, it has been agreed that a UE shall be assigned a Registration Area, RA, in the form of a list of Traffic Area Identifiers, TAIs (see TS 23.501 clause 5.3.2.3). It is the responsibility of the AMF to allocate an RA to a UE and in that process AMF "may take into account various information (e.g. Mobility Pattern and Allowed/Non-allowed area (refer to 5.3.4.1))." (quote from TS 23.501 clause 5.3.2.3). The alignment of an allowed/non-allowed area and the RA is described in TS 23.501 clause 5.3.4.1.2.

There is however, not yet any statement in the 5G standard on aligning the RA with the service areas of the allocated User Plane Functions, UPFs. On the contrary, there are proposals to the current 3GPP meeting (#121) to not let the UPF service areas affect the allocation of an RA, see S2-173136 (Huawei/Hisilicon) and S2-172990 (Ericsson). This will introduce a deviation from legacy networks (4G etc) where the service area of the serving SGW always shall cover the UE's complete TAI-list area (i.e. the RA).

A decoupling of the RA and the UPF's (User Plane Function) service areas means that UPF relocation may be needed for a UE also when moving within the RA. Contribution S2-172990 (Ericsson) takes care of the consequences of UPF relocation with respect to Service Request and Handover by letting the AMF (Access & Mobility Management Function) contact the SMF(s) (Session Management Function) during these mobility procedures and provide the SMF(s) with the new UE location and thereby enabling the SMF(s) to perform UPF relocation.

The S2-173136 contribution deals with aspects related to use of different SSC-modes (Session and Service Continuity) (see TS 23.501 clause 5.6.9.2) and use of local PDU session and especially for SSC mode 2 & 3 and local PDU session, it claims that there is a benefit if the allocated SMF is made aware of when the UE moves out of the UPF service area. Either the UPF then may be reallocated (at SSC mode 2&3) or the PDU (Protocol Data Unit) session is released or deactivated.

Contribution S2-173136 proposes that AMF shall notify the SMF(s) when the UE leaves the area provided by the SMF(s) at request for notification. The SMF provided area could e.g. be the UPF service area. How AMF would know the location of a UE is however not described in the contribution.

There are also other cases where the session management part, either SMF or UPF, need to have service-area based control, e.g. a particular SMF/UPF may provide service only for certain slice in certain area, or a Local Area Data Network, LADN, can only provide service in a very limited area.

In addition to session management the handling of slices with a limited service area is also up for discussion in 3GPP. It shall be noted that the service area for a slice is not necessarily defined by connectivity, but rather that a UE may only be allowed to use a certain slice in a limited area. Currently there is, in 3GPP, no agreement on if the service areas of different slices for a UE should be used a base when deciding the RA. If it is decided that also these should be decoupled from the RA the need for notification when a UE leaves the service area of a slice, may arise (e.g. as a trigger to deactivate related PDU sessions).

If the AMF should consider all these related issues when allocating RA, it becomes very complicated to define the RA and it's also against the spirit of the MM and SM separation promoted in 5G system. It may furthermore result in an RA that is so shrunk that it in many cases becomes useless (e.g. an RA with only one TAI). Therefore, it's suggested that RA allocation shall be decoupled from other service areas e.g. those related to session management.

However, it's not guaranteed that location report though mobility procedures (i.e. UE initiated mobility procedures in CM-IDLE mode and 5G RAN initiated procedures in CM-CONNECTED mode) are good enough, e.g. if SMF/UPF is interested in an area inside a 5G RAN node, e.g. just a few cells. So, a general location report service is proposed to in S2-173884 (this is a revision of the S2-173136 proposal) where e.g. an SMF can subscribe to location service from AMF and requiring AMF to provide location info to SMF when the UE moves in/out of the SMF "interested area" (e.g. the UPF service area).

The outcome of the 3GPP #121 meeting was that contribution S2-172990 was revised twice into contribution S2-173976 which was agreed. Contribution S2-173136 was revised three times (first into S2-173884) into contribution S2-174042 which was agreed.

SUMMARY

The current standard and proposals indicate that AMF shall provide new location info to SMF/UPF, However, how AMF would know the location of the UE is not revealed.

AMF knows UE new location either in CM-IDLE mode through UE triggered N1 signalling where RAN will carry the new UE location info through the N2 interface, or in CM-CONNECTED mode through a Cell Change Reporting from RAN. The following problems are thus encountered:
1) Due to the decoupling of RA and SMF "interested area", current UE N1 mobility signalling for CM-IDLE is very much related to the RA and has nothing to do with the SMF "interested area". UE is not aware of the SMF "interested area" and it is not possible to act upon it.
2) Even for CM-CONNECTED mode, due to the introduction of RRC inactive, it's not even possible for RAN to report the UE location in such state.
3) For a UE in CM-CONNECTED and RRC active (i.e. the UE is in "true" connected mode as in legacy) using the Cell Change Reporting from RAN mechanism may induce extensive signalling between RAN and CN since RAN will report every new cell visited by the UE.

It is first object to set forth apparatuses and methods therefore enabling an efficient control and configuration while reducing network signalling.

This object has been achieved by:

A communication network system comprising core network nodes, CNN, such as Session Management Function, a Policy Control function, PCF, an Online Charging System, OCS, and a Network Exposure Function, NEF, the system further comprising a radio access node, RAN, and a User Entity, UE, the system further comprising a user plane function, UPF, communicating with a data network, DN; and a control plane, which again comprises at least a control plane comprising an Access Mobility Function, AMF, the system being adapted for the AMF
  retrieving or determining a registration area, RA, for the UE.
  The CNN
  retrieving a service area such as a a TA or TAI, and—
    allocating a Presence Reporting Area, PRA,
  informing the AMF of the PRA.
  The AMF
  defining or retrieving a UE Reporting Area, URA, in
    dependence of the RA and the PRA,
  transmitting the URA, to the UE, or
  transmitting the URA to the RAN.

An access Mobility Function, AMF in a communication network comprising a user entity, UE, a radio access node, RAN, and a core network comprising
a user plane function, UPF, communicating with a data network, DN; and
a control plane, which again comprises at least a control plane comprising the Access Mobility Function, AMF; and
a Session Management Function, SMF,
the AMF being adapted for
  retrieving or determining a registration area, RA, for the UE,
  retrieving a presence reporting area, PRA, for the UE,
  defining or retrieving a UE Reporting Area, URA, in
    dependence of the RA and the PRA, at least
  transmitting the URA, to the UE, or
  transmitting the URA to the RAN.

A User entity, UE, in a communication network—is provided—the UE comprising a radio access node, RAN, and a core network comprising
a user plane function, UPF, communicating with a data network, DN; and
a control plane, which again comprises at least a control plane comprising the Access Mobility Function, AMF; and
a Session Management Function, SMF.
The UE is adapted for adopting
at least a CM-IDLE mode or a CM-CONNECTED mode RRC INACTIVE state, the UE also being adapted for adopting a CM-CONNECTED mode RRC ACTIVE state,
if the UE adopting a CM-IDLE mode or a CM-CONNECTED mode RRC INACTIVE state and upon the UE moving in a direction into or out of a UE Reporting Area, URA, the UE being adapted for
  reporting or triggering a reporting of an indication of a
    direction of movement into or out of the URA of the UE
    to the AMF.

Radio Access Node, in in a communication network comprising a radio access node, RAN, and
a core network comprising
a user plane function, UPF, communicating with a data network, DN; and
a control plane, which again comprises at least a control plane comprising the Access Mobility Function, AMF; and
a Session Management Function, SMF;
the UE being adapted for adopting
at least a CM-IDLE mode or a CM-CONNECTED mode RRC INACTIVE state, the UE also being adapted for adopting a CM-CONNECTED mode RRC ACTIVE state,
if the UE adopting a CM-CONNECTED mode RRC ACTIVE state
  upon the UE moving in a direction into or out of the URA,
    reporting the direction of the UE to the AMF.

A communication network system comprising core network nodes, CNN, such as Session Management Function, a Policy Control function, PCF, an Online Charging System, OCS, and a Network Exposure Function, NEF, the system further comprising a radio access node, RAN, and a User Entity, UE, the system further comprising a user plane function, UPF, communicating with a data network, DN; and a control plane, which again comprises at least a control plane comprising an Access Mobility Function, AMF, the system being adapted for the AMF
  retrieving or determining a registration area, RA, for the UE.
  The CNN
  retrieving a service area such as a a TA or TAI, and—
    allocating a Presence Reporting Area, PRA,
  informing the AMF of the PRA.
  The AMF
  defining or retrieving a UE Reporting Area, URA, in
    dependence of the RA and the PRA,
  transmitting the URA, to the UE, or
  transmitting the URA to the RAN.

According to some embodiments of the invention, the AMF shall provide the UE with a UE Reporting Area, URA (similar to Presence Areas, PRA, that is used today in 4G for a UE in connected mode, but handled by core network, CN, and radio access node, RAN). The URA should be a sub-area of the Reporting Area, RA and is defined by a set of cells, gNBs or traffic area identifiers, TAIs, or a combination of them. Whenever a UE in idle mode or RRC inactive Connected mode, crosses the border of such a provided area it shall send a notification to the AMF via RAN who adds current location of the UE. Similarly, for a UE in RRC active Connected mode ("true" Connected) the AMF provides the RAN with the URA(s) and RAN instead of sending every cell change it only sends notifications when the UE crosses an URA border.

This service may, as described in the examples below, be used by SMF, PCF and OCF to get a presence reporting for a UE but is not limited to these consumers. Any consumer may request the service and even AMF may internally trigger a presence reporting based on the service provided.

The object above has also been achieved by corresponding methods to the entities mentioned above.

DETAILED DESCRIPTION

According to embodiments of the invention, a data structure, here denoted UE reporting Area, URA, is resolved—or defined—from the input parameters Registration Area, RA, and Presence Area, PRA, which seeks to solve at least some of the indicated problems above.

Figure 1:
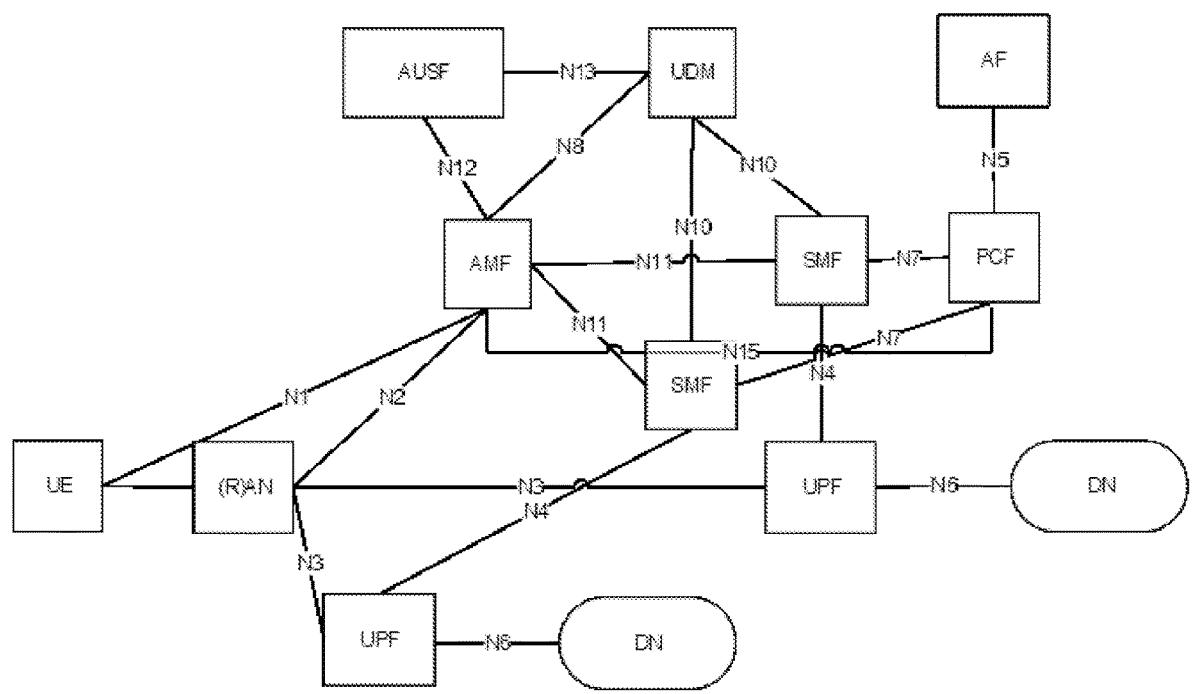
FIG. 1 shows a known 5G architecture showing moreover a UE, RAN, Core node and data network.
Figure 2:
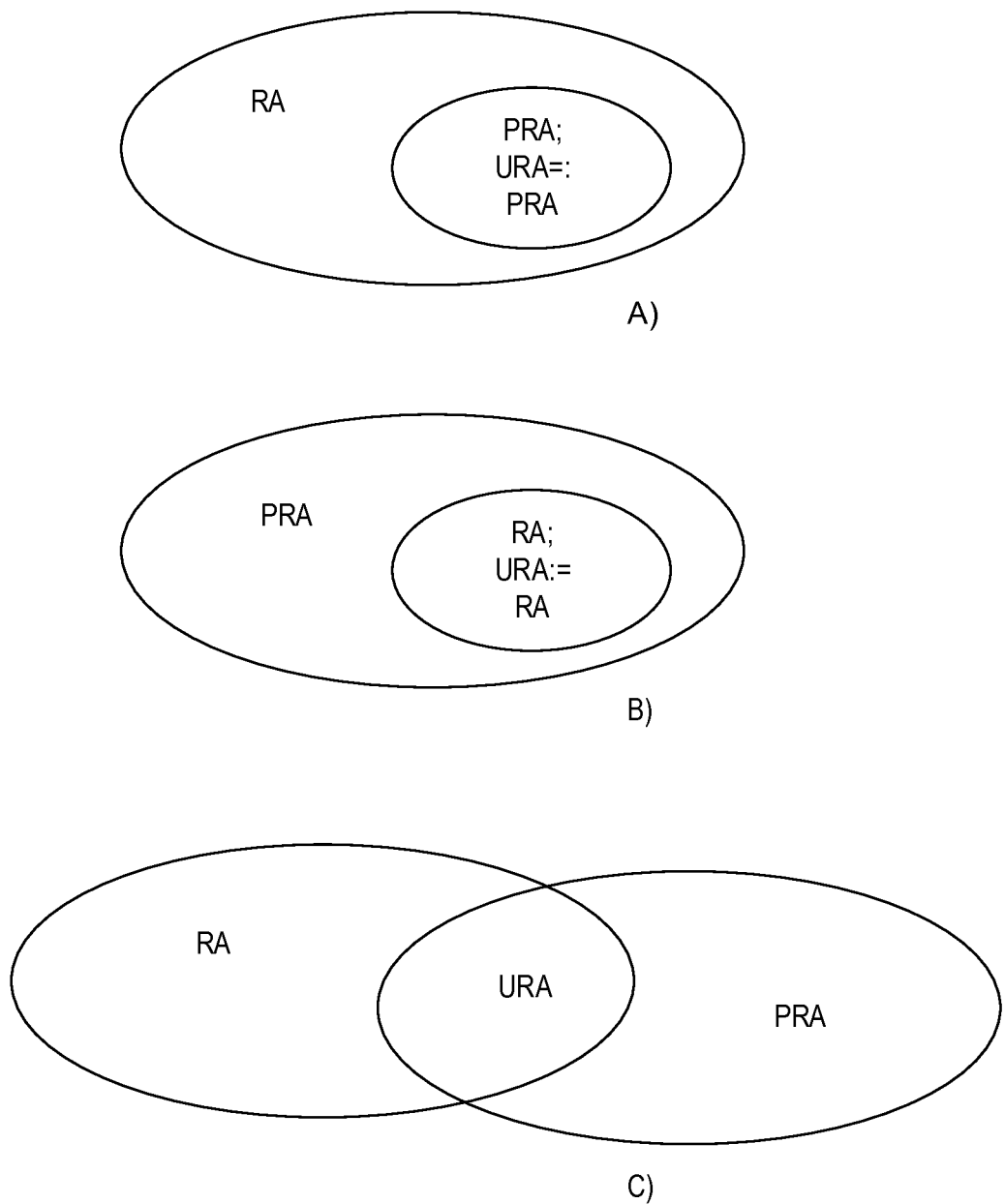
FIG. 2 shows reporting areas, RA, presence reporting areas, PRA, from which a UE reporting area, URA, is resolved according to embodiments of the invention.

In FIG. 2 various examples of areas according to the invention are shown.

According to embodiments of the invention, the AMF shall provide the UE with the UE Reporting Area, URA (Presence Areas, PRA, are used today in 4G for a UE in connected mode, but handled by core network, CN, and radio access node, RAN). The URA should be a sub-area of the Reporting Area, RA and is defined by a set of cells, gNBs or traffic area identifiers, TAIs, or a combination of them. Whenever a UE in idle mode or RRC inactive Connected mode, crosses the border of such a provided area it shall send a notification to the AMF via RAN who adds current location of the UE. Similarly, for a UE in RRC active Connected mode ("true" Connected) the AMF provides the RAN with the URA(s) and RAN instead of sending every cell change it only sends notifications when the UE crosses an URA border. This service may, as described in the examples below, be used by SMF, PCF and OCF to get a presence reporting for a UE but is not limited to these consumers. Any consumer may request the service and even AMF may internally trigger a presence reporting based on the service proposed in this IvD.

In FIG. 2, reporting areas, RA, and presence reporting areas, PRA, are shown, from which a UE reporting area, URA, is resolved according to embodiments of the invention.

The URA is resolved in the following way according to an embodiment of the invention:

A) If the PRA is a true sub-part of the RA, the URA area is set equal to the PRA.

B) If the PRA covers the complete RA, no URA area is needed. The URA may be set equal to the RA.

C) If the PRA is only partly overlapping the RA, the URA is defined as the area commonly covered by both PRA and RA.

In summary, for cases A), B), and C) it applies that the URA is defined as the overlapping or joint area of PRA and RA.

By letting the UE notify the CN when a reporting area (URA) border is crossed and by handling the RA and various URAs separately it becomes possible to use a finer granularity for the URA compared to the level that is used for the RA (i.e. the TA level). Service areas for UPFs at SSC mode 2&3, LADN and slices may be defined based on cell and/or gNB levels.

AMF may decide an RA without involving SMF related service areas i.e. a decoupling of MM and SM as decided by 3GPP is achieved. It becomes much easier for AMF to derive the RA.

The UE will still need to trigger signalling to the CN with the same frequency as if the RA had been aligned with the various URAs, but the signalling is made more light weighted according to embodiments of the invention; and there is only a need to indicate crossing of a border and direction compared to a full-fledged registration area update procedure.

Figure 4:
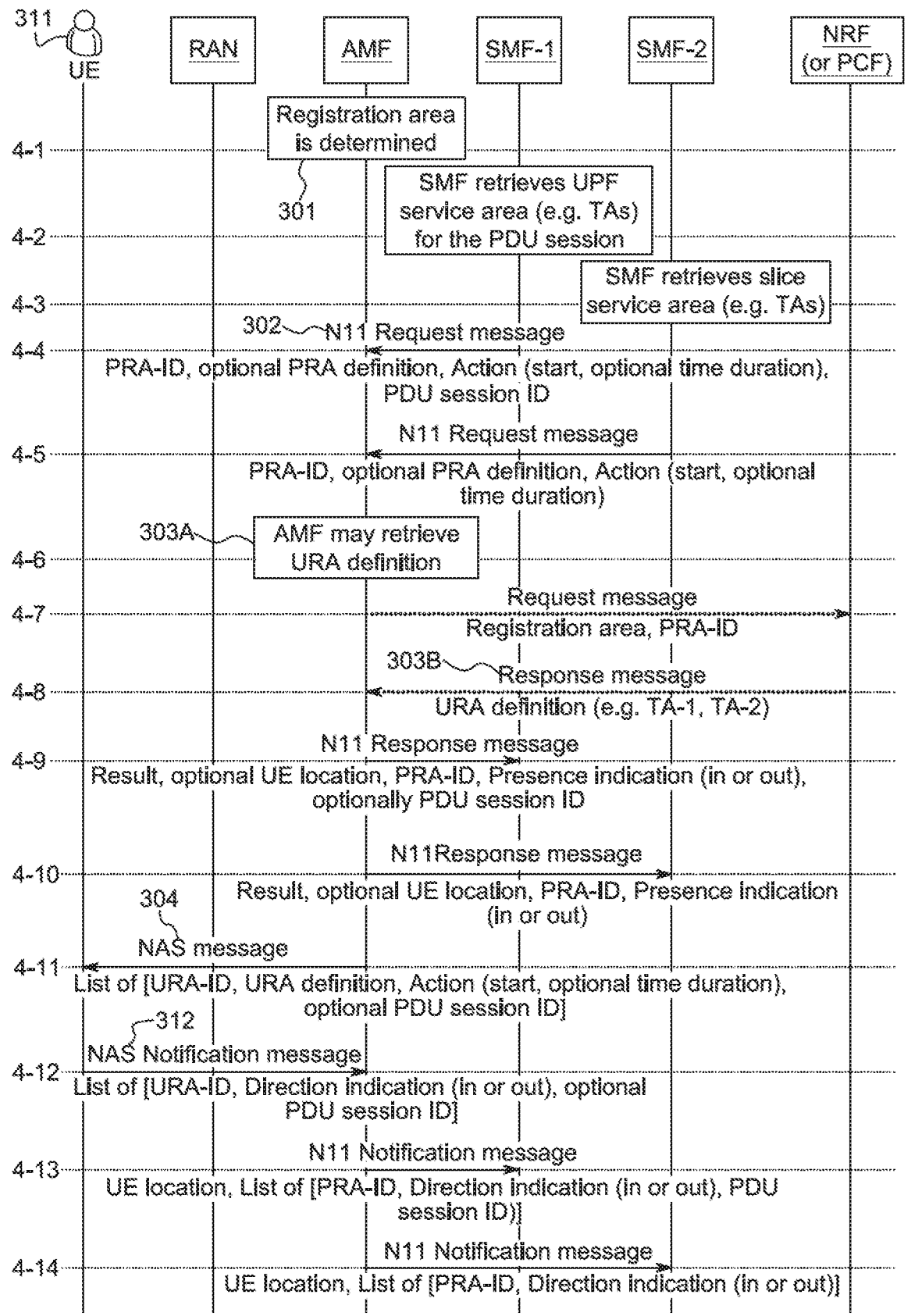
FIG. 4 shows an exemplary URA and PRA activation and reporting for UPF service area/slice area when the UE is in CM-Idle or in RRC-inactive state and the consumer are SMFs.
Figure 5:
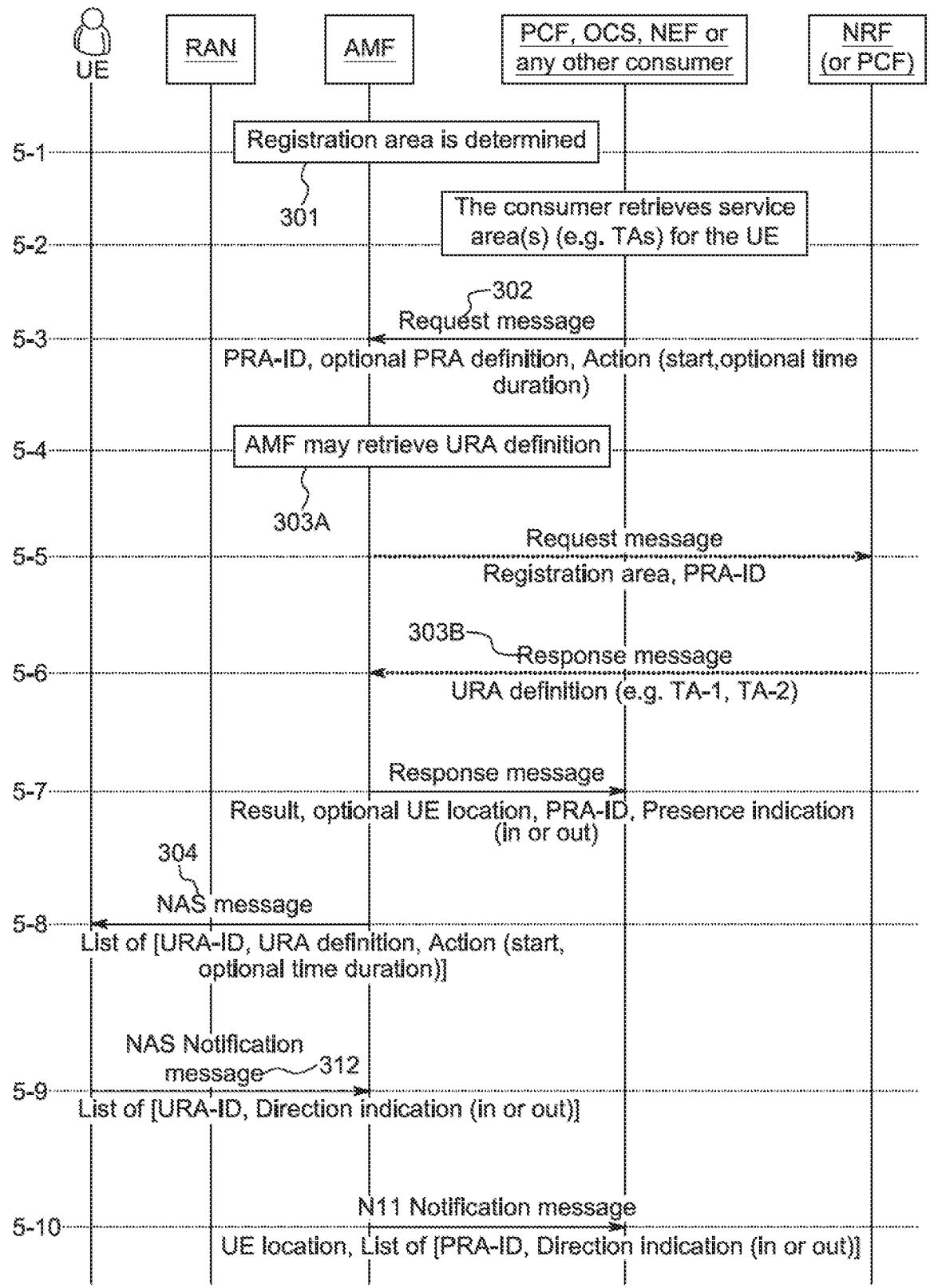
FIG. 5 shows an exemplary URA and PRA activation and reporting for service area from UE when the UE is in CM-Idle or in RRC-inactive state and the consumer is PCF, OCS or any other consumer (e.g. NEF)

Below some features of various embodiments of the invention are indicated:
1) URA (UE Reporting Area) and PRA (Presence Reporting Area) activation and reporting for service area (e.g. UPF service area/slice area) from UE when the UE is in CM-Idle or in RRC-inactive state and the consumer are SMFs (FIG. 4)
2) URA derivation based on PRA and RA (FIG. 2)
3) URA (UE Reporting Area) and PRA (Presence Reporting Area) activation and reporting for service area from UE when the UE is in CM-Idle or in RRC-inactive state and the consumer is PCF, Online Charging System, OCS, or any other consumer (e.g. NEF) (FIG. 5)

Figure 6:
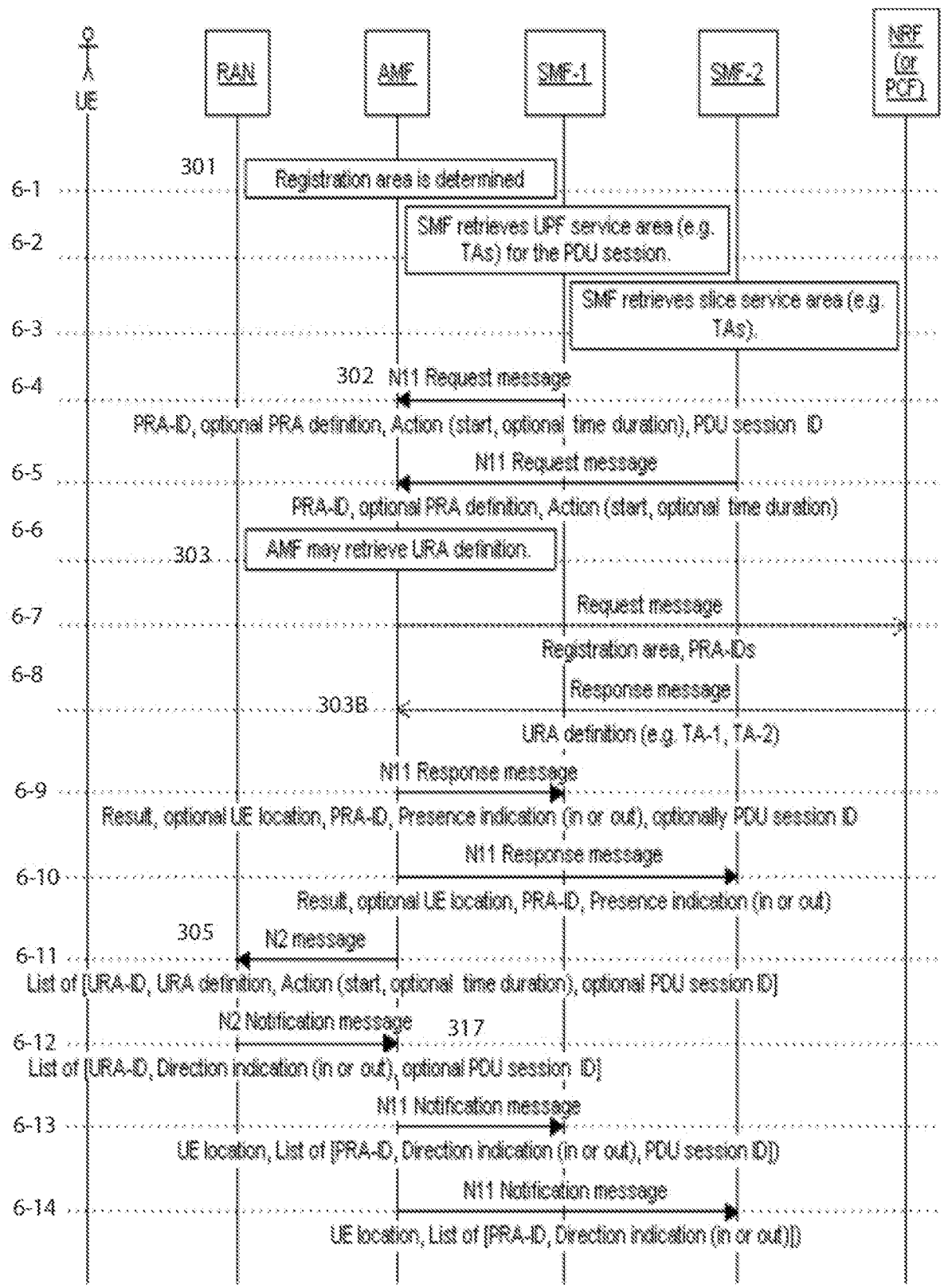
FIG. 6 shows an exemplary URA and PRA activation and reporting for UPF service area/slice area from 5G RAN when the UE is in CM-Connected and in RRC-active state and the consumers are SMFs.

4) URA (UE Reporting Area) and PRA (Presence Reporting Area) activation and reporting for area (e.g. UPF service area/slice area) from 5G RAN when the UE is in CM-Connected and in RRC-active state and the consumer is SMFs (FIG. 6)

Figure 7:
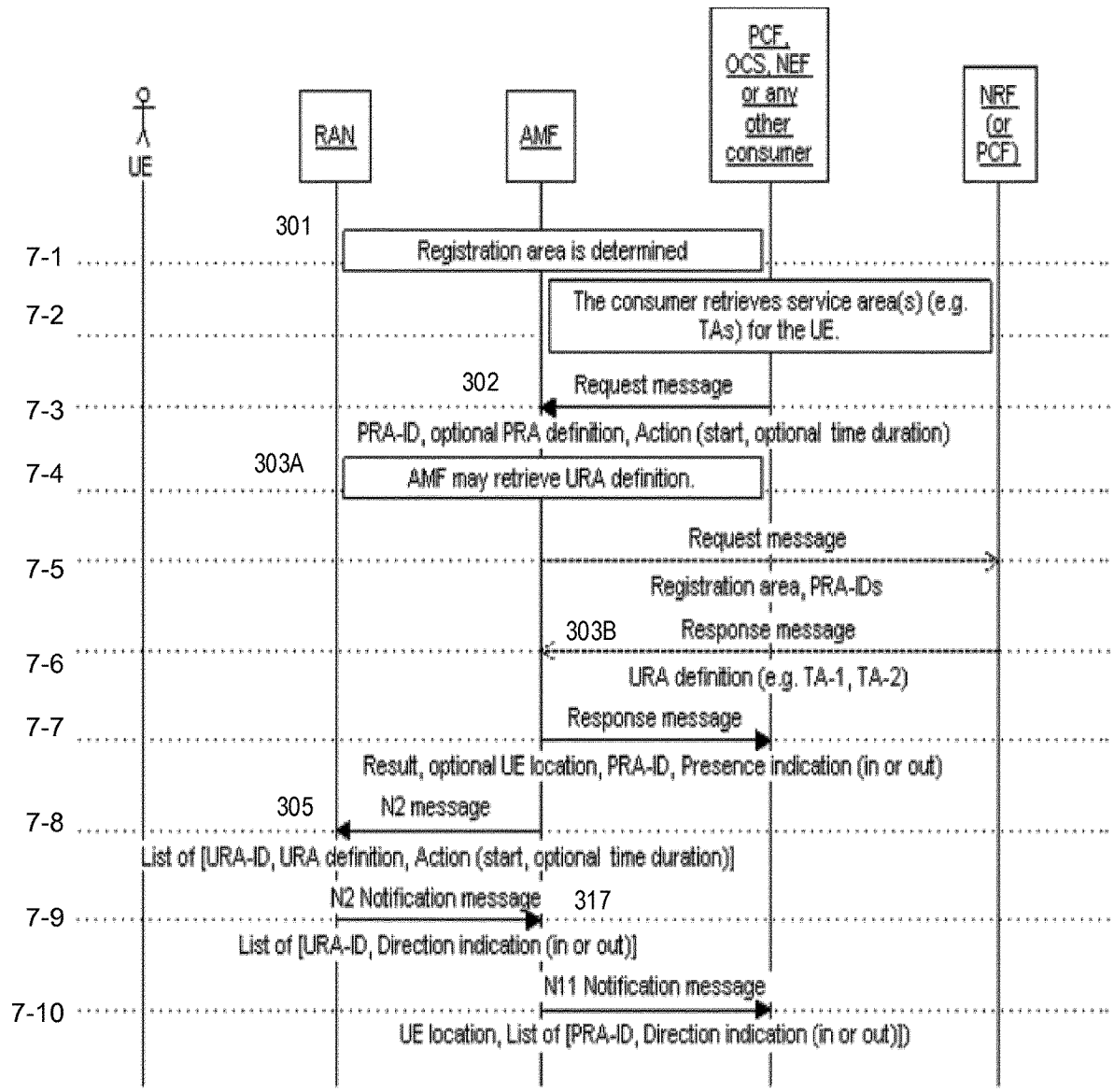
FIG. 7 shows an exemplary URA and PRA activation and reporting for service area from 5G RAN when the UE is in CM-Connected and in RRC-active state and the consumer is PCF, OCS or any other consumer (e.g. NEF)

5) URA (UE Reporting Area) and PRA (Presence Reporting Area) activation and reporting for service area from 5G RAN when the UE is in CM-Connected and in RRC-active state and the consumer is PCF, OCS or any other consumer (e.g. NEF) (FIG. 7)

Figure 8:
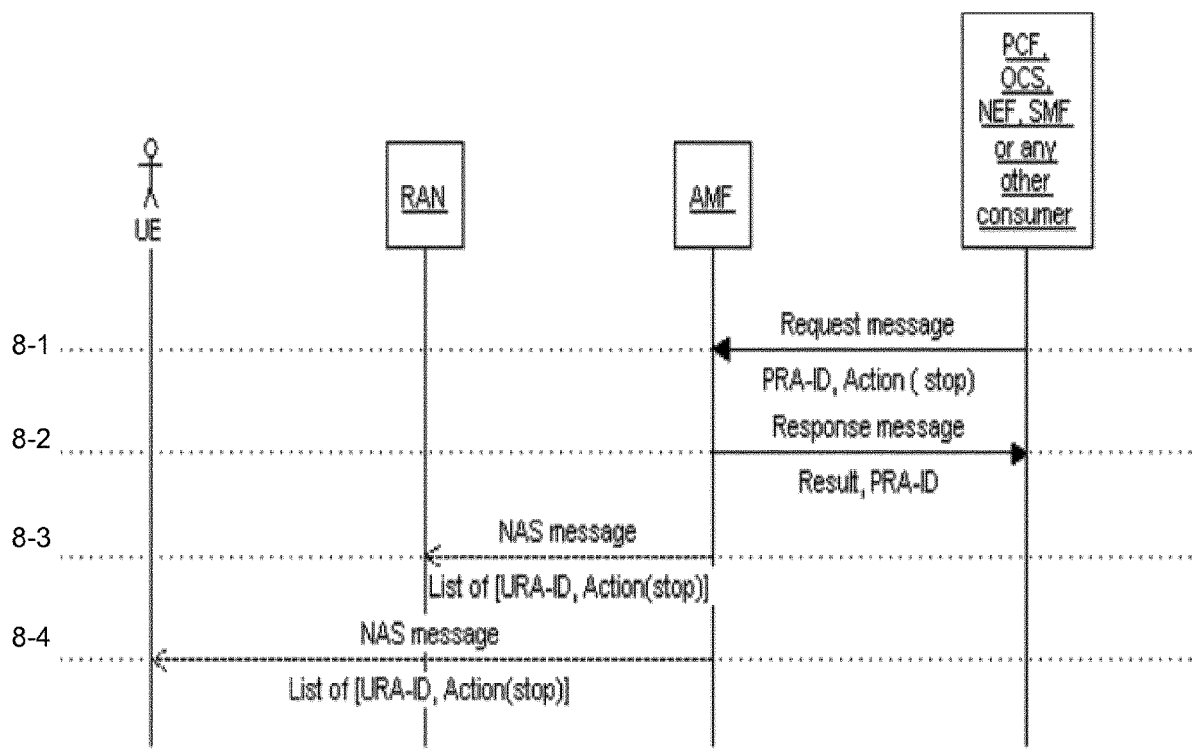
FIG. 8 shows an exemplary deactivation procedure of a PRA request by a general consumer when the UE is in in (A) CM-Idle or in RRC-inactive state, or (B) in CM-Connected and in RRC-active state.

6) Deactivation of a PRA request by a general consumer when the UE is in in (A) CM-Idle or in RRC-inactive state, or (B) in CM-Connected and in RRC-active state (FIG. 8)

It shall be noted that even though each flow shows a complete sequence diagram, it is also possible to use service-based architecture (SBA) in each CN interface e.g. between AMF and Network Repository Function, NRF.

Figure 3:
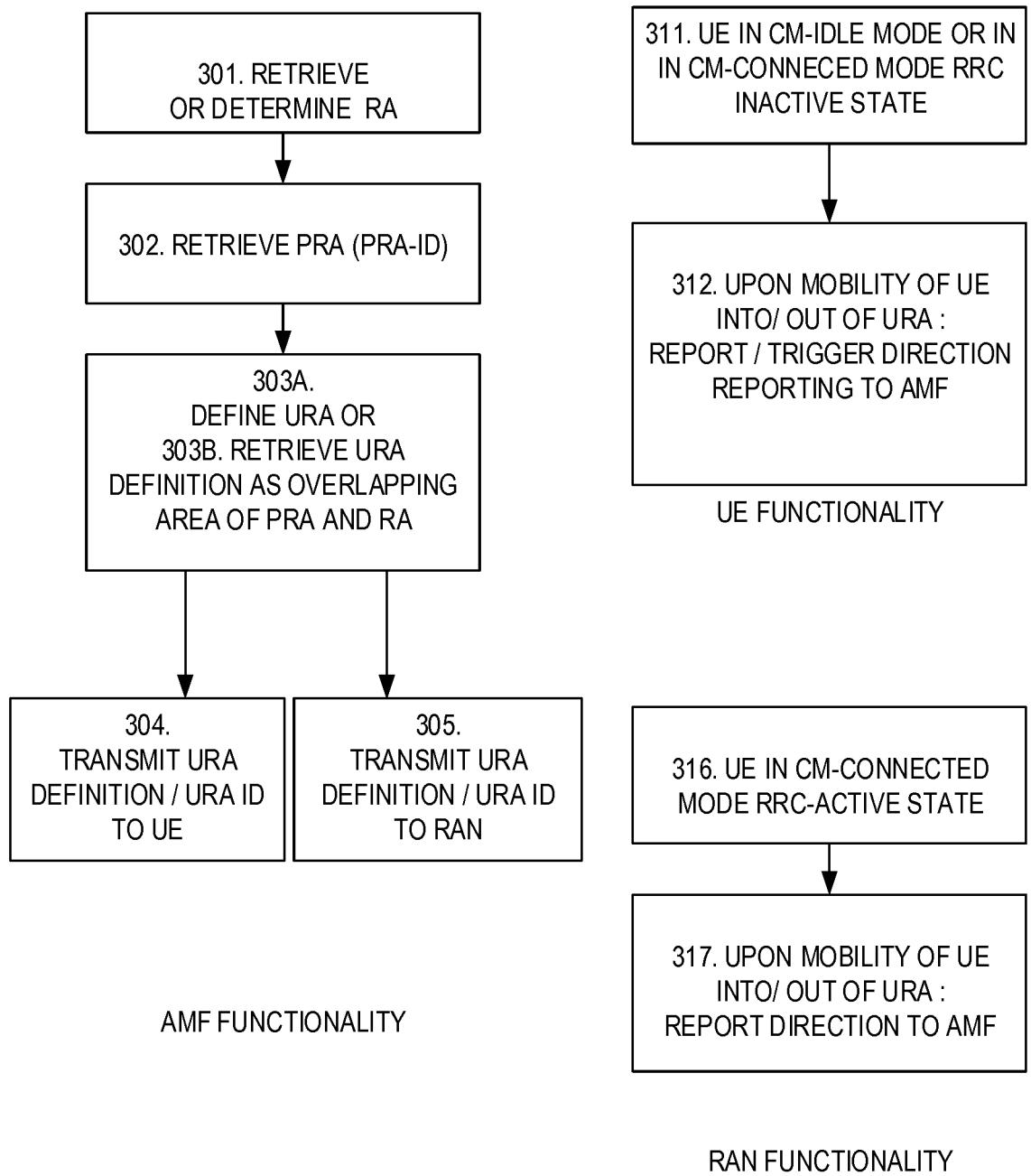
FIG. 3 shows functionalities for AMF, RAN and UE according to embodiments of the invention.

In FIG. 3, embodiments of functionalities for AMF, RAN and UE according to embodiments of the invention are indicated.

In step 301 the Registration Area, RA, is retrieved and in 302 the Presence Reporting Area is retrieved by the AMF.

As shown in FIG. 2, the AMF in 303 defines a further area, the URA, by resolving an area corresponding to the overlap between the RA and the PRA.

The resolved URA is transmitted to at least one of the UE, step 304, and the RAN, step 305.

If the UE is in CM-IDLE mode or in RRC-INACTICE CONNECED mode, 311, and upon the UE moving in a direction into or out of the defined URA, the UE reports or triggers a reporting, 312, of the direction of movement to the AMF.

If the UE is in RRC-ACTIVE-CONNECTED mode, 316, upon the UE moving in a direction into or out of the defined URA, the RAN reports, 317, the direction of movement to the AMF.

Figure 3B:
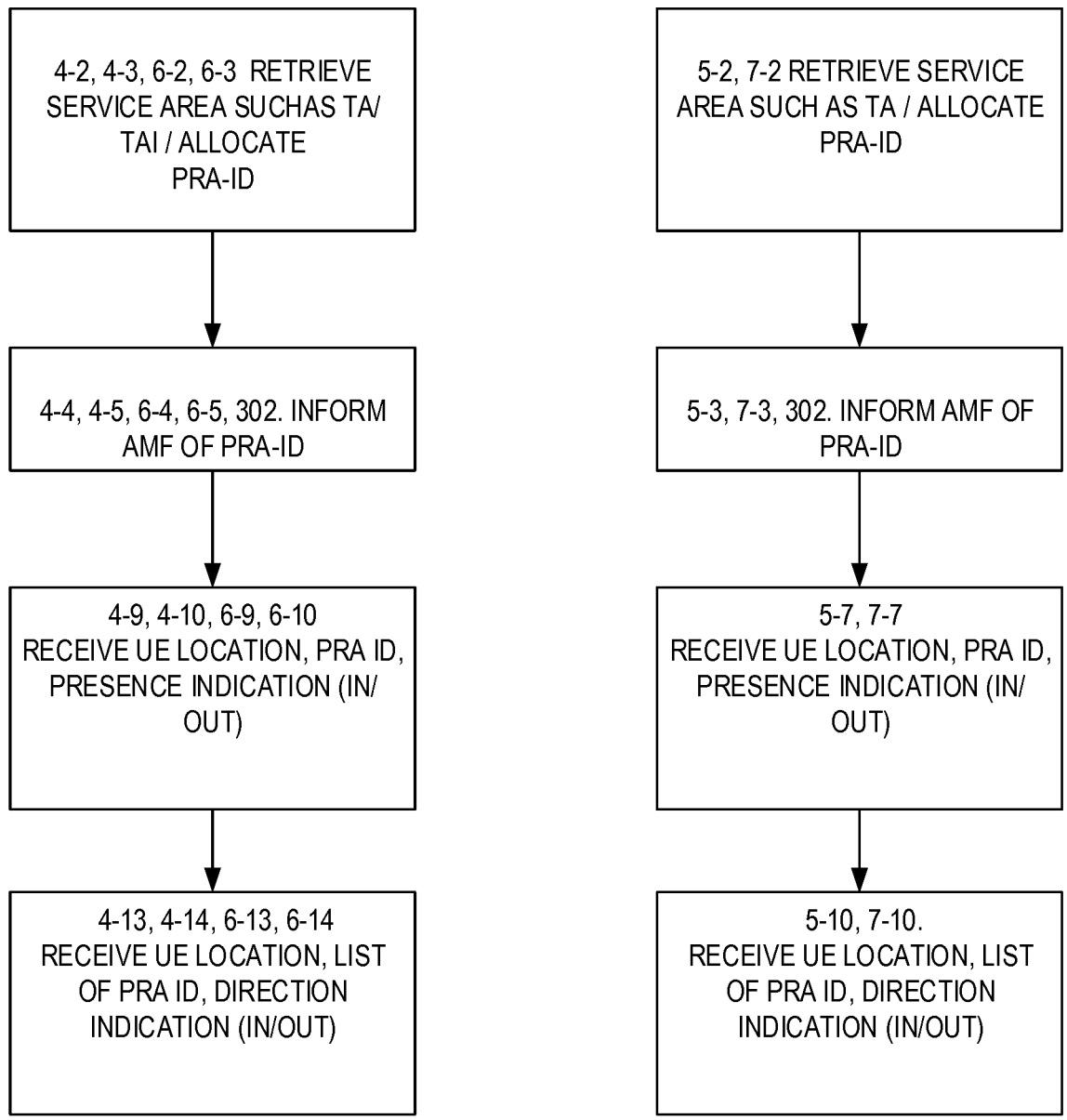
FIG. 3B shows SMF functionalities as well as PCF, OCS and NEF functionalities according to embodiments of the invention.

FIG. 3B shows Session management Function, SMF, functionalities as well as Policy Control function, PCF, Online Charging System, OCS, and Network Exposure Function, NEF, functionalities according to embodiments of the invention.

In a first step, 4-2, 4-3, 6-2, 6-3, a service area such as TA/TAI/is retrieved, and/or a PRA is allocated. An identity PRA-ID may designate the PRA. Also, the PCF, OCS, NEF, retrieve a service area such as TA and allocates a PRA-ID.

In 4-4, 4-5, 6-4, 6-5, 302, the SMF informs the AMF of the PRA-ID. Also, the PCF, OCS, NEF, informs the AMF, 5-3, 7-3 of the PRA-ID The SMF receives 4-9, 4-10, 6-9, 6-10 a UE location, PRA-ID and a presence location whether the UE is inside or outside of the indicated PRA designated by the PRA-ID. The same applies 5-7, 7-7 for PCF, OCS, NEF.

The SMF receives in a further step or steps 4-13, 4-14, 6-13, 6-14 an update of the UE location, a list of PRA-IDs and an indication whether the UE is moving/has moved in a direction into or out from a PRA-ID. The same applies 5-10, 7-10 for PCF, OCS, NEF.

FIG. 4 concerns an example of URA (UE Reporting Area) and PRA (Presence Reporting Area) activation and reporting for UPF service area/slice area when the UE is in CM-Idle—311—or in RRC-inactive state and the consumer are SMFs according to the invention.

4-1) After UE is registered in 5G system, AMF allocates a registration area (RA)—301—4-1, Registration area is determined, to the UE. The allocated RA is not aligned to any "area" that may be of interest by an SMF.

4-2)-4-5) SMF(s) retrieves UPF service area for the PDU session or slice service area and also retrieves (a) a corresponding PRA-ID or as an alternative (b) includes the area in the PRA definition and allocates a corresponding PRA-ID. 4-2, SMF-1 retrieves UPF service area, e.g. TA's, for the PDU session. 4-3, SMF-2 retrieves the service area (e.g. TAI). During the PDU session establishment or after the PDU session establishment, SMF(s) informs AMF, 4-4, 4-5 in N11 Request message(s), of a Presence Reporting Area (PRA) including a PRA-ID—302—and optionally a Presence Reporting Area definition (i.e. a list of cells, Next generation Node Bs, gNBs or Tracking Area Identifiers, TAIs, or a combination thereof). Additionally, the SMF(s) may request if the UE currently is within or outside the PRA. Action indicates start of presence reporting and optionally a time duration indicating how long the PRA reporting shall be active and thus when the reporting shall be stopped by AMF (the SMFs may in addition stop the presence reporting at any time, see FIG. 8) as well as a PDU session ID.

If the PRA definition is included from SMF(s) or if AMF, retrieves it 4-6 from local configuration, AMF derives— 303A—a "UE Reporting Area", URA definition as explained above. AMF may optionally store the PRA definition. The reason for storing PRA definition is for keeping it due to a possible future URA reporting from RAN (see FIGS. 6 and 7). Otherwise AMF requests 4-7/4-8—303B— the URA from the NRF/PCF by providing the PRA-ID and the RA, e.g. if the PRA definition is not known by AMF.

The NRF/PCF may hold a PRA definition per PRA-ID. NRF/PCF retrieves the PRA definition (e.g. UPF service area or slice service area) valid for the PRA-ID and extracts the URA. The NRF/PCF responds to the AMF including the derived URA definition.

Based on the respective PRA definition and the RA allocated to UE, either the NRF/PCF or the AMF derives the URA as described above in connection with FIGS. 2 and 3:

4-9)-4-10) AMF responds to each PRA request from the SMF(s) indicating if the request is accepted in N11 messages (Result, PRA ID). If accepted and if required by an SMF (e.g. SMF-1, SMF2), AMF indicates if the UE currently is within or outside the requested PRA and optionally provides UE location. This may require the AMF to page the UE.

Per each PRA-ID, AMF stores the PRA-ID, optionally PRA definition (if received from SMF) and optionally PDU-session ID.

AMF may alternatively determine to align the RA with the derived URA definition(s). If the RA is aligned with the URA(s) definition(s) then no requests are sent to the UE (as AMF will be notified in with registration procedure anyway).

For each URA request sent to the UE, AMF assigns an URA-ID and associates it to the corresponding PRA-ID. If Multiple PRA requests are received, AMF may either coordinate these requests and send one N1 message (NAS message) 4-11 including the multiple corresponding URA requests to the UE, or AMF may send multiple N1 messages each with one URA request to UE and each indicating a possibly related PDU session ID. The N1 message(s) includes URA-ID, URA definition and optionally PDU Session ID.

The UE stores the received URA info (URA-ID and URA definition) and optionally the PDU session ID.

4-12) Whenever the UE, due to mobility, that may arise subsequently crosses a URA boundary in CM-IDLE mode or CM-CONNECTED RRC inactive state when within the Registration Area and as a direct respond, an N1 message shall be triggered by the UE. In this message, the UE shall provide URA-ID(s)—312—Direction indication(s) (In/Out) and optionally the associated PDU session ID(s). The Direction indication gives the information whether the UE moves in to the URA or out of the URA.

Note: The N1 message for URA reporting from UE, 4-12, 312 can either be a new defined message or an extension of an existing message.

4-13)-4-14) Based on URA-ID to PRA-ID mapping, or optionally based on the PDU session ID, the AMF derives the associated SMF(s) per specific URA report and creates a PRA reporting message, N11 (UE location, List of (PRA-ID, Direction indication (in or out), PDU session ID)) to each concerned SMF including the UE location (the UE location is provided by RAN). SMFs will take proper action based on the reported info.

FIG. 5 concerns the case of URA (UE Reporting Area) and PRA (Presence Reporting Area) activation and reporting for service area from UE when the UE is in CM-Idle or in RRC-inactive state and the consumer is PCF, OCS or any other consumer (e.g. NEF).

Steps are analogous to those shown and described in FIG. 4.

FIG. 6 concerns URA (UE Reporting Area) and PRA (Presence Reporting Area) activation and reporting for area (e.g. UPF service area/slice area) from 5G RAN when the UE is in CM-Connected and in RRC-active state and the consumer is SMFs.

Steps 6-1)-6-10) are similar as in FIG. 4.

As above, 6-9)-6-10) AMF responds (N11 messages) to each PRA request from the SMF(s) indicating if the request is accepted. If accepted and if required by an SMF, AMF indicates if the UE currently is within or outside the requested PRA and optionally provides UE location. This may require the AMF to request UE's current location from RAN.

6-11) Per each PRA-ID, AMF stores the PRA-ID and optionally the PRA definition (if received from SMF). The reason for storing the PRA definition is to reuse it at a possible change of RAN node while the UE is still in is in CM-Connected and in RRC-active state.

If Multiple PRA requests are received, AMF may either coordinate these requests and send one N2 message (to RAN) 6-11 including multiple corresponding URA requests to the RAN, or AMF may send multiple N2 messages each with one URA request to RAN. The N2 message(s) to RAN includes URA-ID and URA definition—305. For each URA request, AMF assigns the URA-ID and associates it to the corresponding PRA-ID.

6-12) The RAN stores the received URA info (URA-ID and URA definition). Whenever the UE, due to mobility, crosses a URA boundary in CM-Connected and in RRC-active state an N2 notification message 317 to, AMF shall be triggered by the RAN. In this message, the RAN shall provide URA-ID(s) and Direction indication(s) (In/Out) (also PDU session ID). The Direction indication gives the information whether the UE moves in to the URA or out of the URA.

Note: The N2 message for URA reporting from RAN can either be a new defined message or an extension of an existing message.

6-13)-6-14) Based on URA-ID to PRA-ID mapping, the AMF derives the associated SMF(s) per specific URA report and creates a PRA reporting message, N11 Notification message, to each concerned SMF including the UE location (the UE location is provided by RAN), and e.g. List of PRA-ID, direction indication (in or out), PDU session ID. SMF will take proper action based on the reported info.

FIG. 7 concerns URA (RAN Reporting Area) and PRA (Presence Reporting Area) activation and reporting for service area from 5G RAN when the UE is in CM-Connected and in RRC-active state and the consumer is PCF, OCS or any other consumer (e.g. NEF).

Steps are analogues to those described for FIG. 6.

FIG. 8 concerns a deactivation of a PRA request by a general consumer when the UE is in in (A) CM-Idle or in RRC-inactive state, or (B) in CM-Connected and in RRC-active state.

8-1)-8-2) A consumer (e.g. Point Coordination Function, PCF, OCS, NEF or SMF) decides to stop an ongoing PRA reporting. The consumer informs AMF by sending a Request message with PRA-ID and an Action indicating stop of presence reporting. AMF acknowledges the request by sending a Response message.

8-3)-8-4) The AMF derives the URA-ID from the PRA-ID. (A) If the UE is in i CM-Idle or in RRC-inactive state AMF sends a NAS message to the UE indicating URA-ID and Action stop of URA reporting. The UE stops URA reporting (B) If the UE is in in CM-Connected and in RRC-active state AMF sends an N2 message to RAN indicating URA-ID and Action stop of URA reporting. The RAN stops URA reporting.

Figure 9:
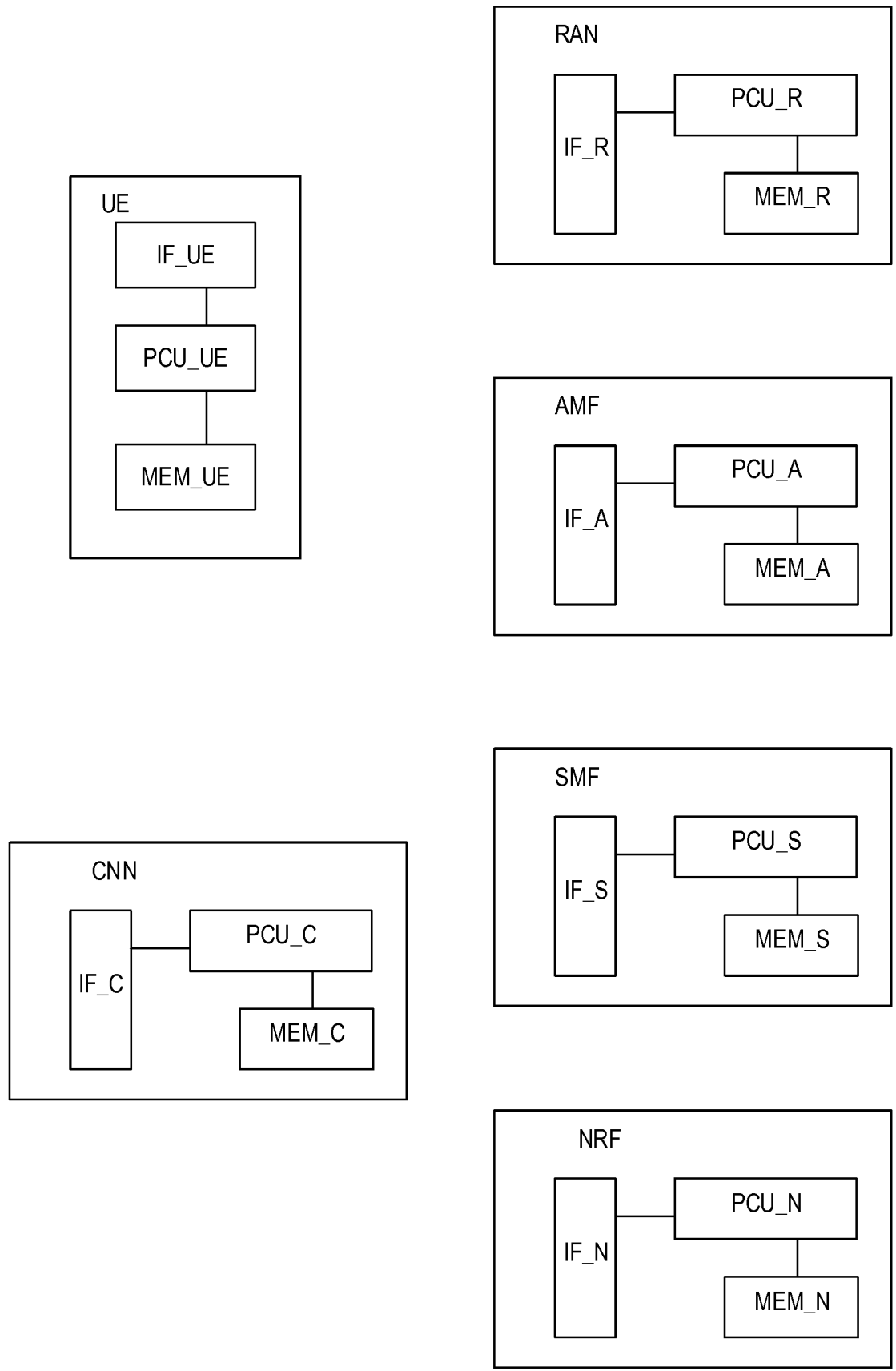
FIGS. 9-10 show various entities and implementations according to embodiments of the invention.

In FIG. 9, a user entity, UE, apparatus according to some embodiments of the invention is shown. The UE comprises a processor PCU_UE an interface IF_UE and a memory, MEM_UE, in which memory instructions are stored for carrying out the method steps explained above. The UE communicates via the interface IF_UE. The IF_UE comprises both an external interface, communicating with a transmitter and receiver, and internal interfaces (not shown).

There is also shown a Radio Access Node, RAN, comprising a processor PCU_R, an interface IF_R; and a memory, MEM_R. Instructions are stored in the memory for being performed by the processor such that the method steps explained above are carried out and signalling is communicated on the interface.

Moreover, an Access and Mobility Function, AMF is provided comprising a processor PCU_A, an interface IF_A; and a memory, MEM_A. Instructions are stored in the memory for being performed by the processor such that the method steps explained above are carried out and signaling is communicated on the interface.

Further, a Session Management Function, SMF is provided comprising a processor PCU_S an interface IF_S; and a memory, MEM_S. Instructions are stored in the memory for being performed by the processor such that the method steps explained above are carried out and signaling is communicated on the interface.

In FIG. 9, there is moreover shown a Network Repository Function, NRF, comprising a processor PCU_N, an interface IF_N; and a memory, MEM_N. Instructions are stored in the memory for being performed by the processor such that the method steps explained above are carried out and signalling is communicated on the interface.

In FIG. 9, there is moreover shown a Core Network Function, CNN, comprising a processor PCU_C, an interface IF_C; and a memory, MEM_C. Instructions are stored in the memory for being performed by the processor such that the method steps explained above are carried out and signalling is communicated on the interface.

The above apparatuses/entities are adapted to communicate over known external telecom interfaces or via application programming interfaces, API, as appropriate.

A computer program or computer program product is provided carrying out the method steps defined above.

Figure 10:
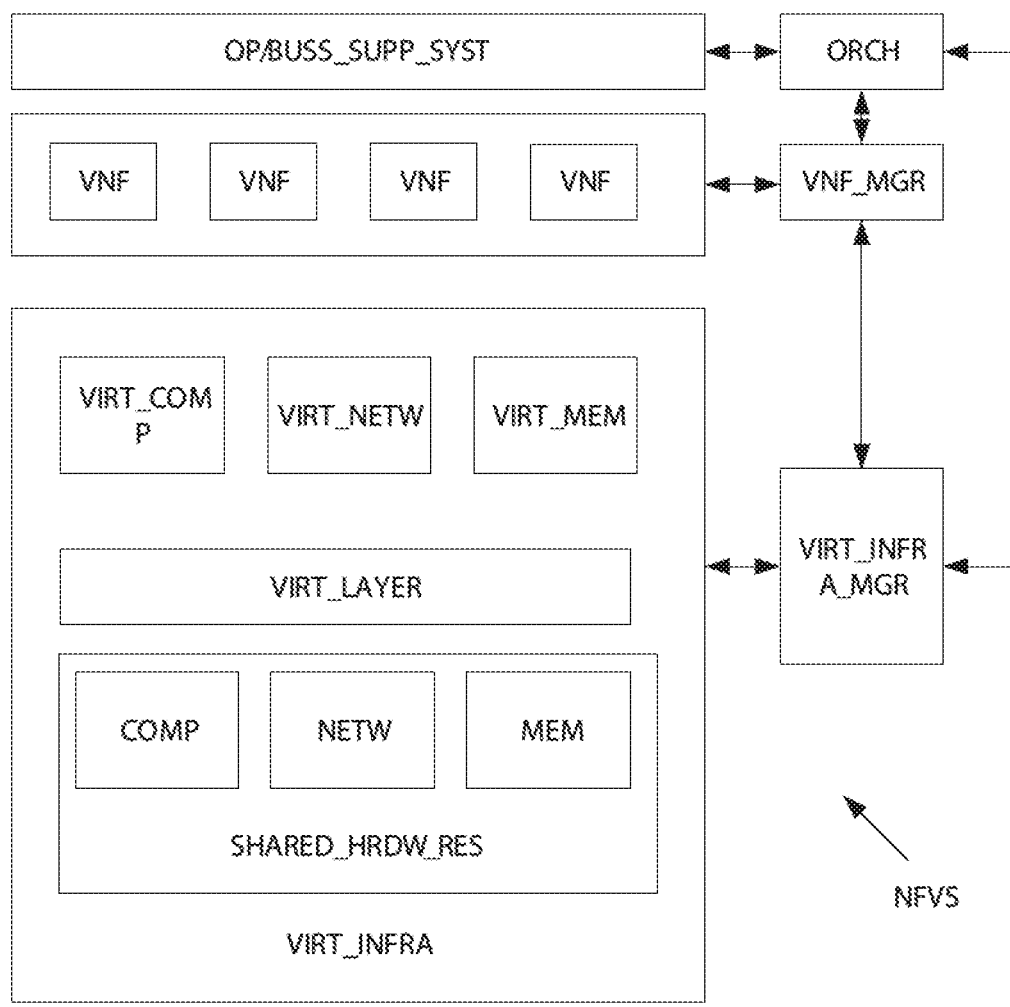

The methods discussed above may alternatively be implemented by means of a system based on network functions virtualization. In FIG. 10, further embodiments of the invention are implemented by means of such a network function virtualization system, NFVS, formed on e.g. general-purpose servers, standard storage and switches. The NFVS may be arranged along the lines described in FIG. 4, ETSI GS NFV 002 V. 1.1.1 (2013-10) and comprises the following elements: A NFV management and orchestration system com-prising an Orchestrator, ORCH, a VNF manager, VNF_MGR, and a virtualised Infra-structure manager, VIRT_INFRA_MGR. The NFVS moreover comprises an operational/business support system, OP/BUSS_SUPP_SYST; a number of virtual network function instances, VNF, by which the method steps explained above are instantiated; and a virtualised infrastructure, VIRT_INFRA. The VIRT_INFRA comprises a virtual computing, VIRT_COMP, virtual network; VIRT_NETW, and virtual memory, VIRT_MEM, a virtualisation layer, VIRT_LAYER, (e.g. hypervisor) and shared hardware resources, SHARED_HARDW_RES comprising computing devices, COMP, network devices, NETW, comprising e.g. standard switches and other network devices, and standard data storage devices, MEM.

FURTHER EMBODIMENTS

System comprising a user entity, UE and a communication network comprising a radio access node, RAN, and a core network comprising
a user plane function, UPF, communicating with a data network, DN; and
a control plane, which again comprises at least a control plane comprising an Access Mobility Function, AMF; and a Session Management Function, SMF,
the system being adapted for
    retrieving (301) a registration area, RA, for the UE,
    retrieving (302) a presence reporting area, PRA, for the UE,
    defining a UE reporting area, URA, by resolving an area corresponding to the overlap between the RA and the PRA,
    transmitting (304) the URA to the UE,
    transmitting (305) the URA to the RAN.
The URA may further be defined by a set of cells, gNBs and/or traffic area identifiers, TAIs.
User entity, UE, in a communication network comprising a radio access node, RAN, and a core network comprising a user plane function, UPF, communicating with a data network, DN; and
a control plane, which again comprises at least a control plane comprising the Access Mobility Function, AMF; and a Session Management Function, SMF;
the UE being adapted for adopting
at least a CM-IDLE mode or a CM-CONNECTED mode RRC INACTIVE state, the UE also being adapted for adopting a CM-CONNECTED mode RRC ACTIVE state,
    if the UE adopting a CM-IDLE mode or a CM-CONNECTED mode RRC INACTIVE state and upon the UE moving (311) in a direction into or out of the URA,
    reporting or triggering a reporting (312) of the direction of the UE to the AMF.
Radio Access Node (RAN, gNB), in in a communication network comprising a radio access node, RAN, and a core network comprising
a user plane function, UPF, communicating with a data network, DN; and
a control plane, which again comprises at least a control plane comprising the Access Mobility Function, AMF; and a Session Management Function, SMF;
the UE being adapted for adopting
at least a CM-IDLE mode or a CM-CONNECTED mode RRC INACTIVE state, the UE also being adapted for adopting a CM-CONNECTED mode RRC ACTIVE state,
    if the UE adopting a CM-CONNECTED mode RRC ACTIVE state
    upon the UE moving (316) in a direction into or out of the URA,
    reporting (317) the direction of the UE to the AMF.
System wherein reporting the UE moving in a direction into or out of the URA is further transmitted to at least one of SMF, PCF and OCF.
In conclusion there is provided:
A communication network system comprising core network nodes, CNN, such as Session Management Function, a Policy Control function, PCF, an Online Charging System, OCS, and a Network Exposure Function, NEF, the system further comprising a radio access node, RAN, and a User Entity, UE, the system further comprising a user plane function, UPF, communicating with a data network, DN; and
a control plane, which again comprises at least a control plane comprising an Access Mobility Function, AMF, the system being adapted for the AMF
    retrieving 301, 4-2, 5-1 or determining a registration area, RA, for the UE.
The CNN
    retrieving 4-2, 4-3, 6-2, 6-3; 5-2, 7-2 a service area such as a a TA or TAI, and—allocating a Presence Reporting Area, PRA,
    informing 4-4, 4-5, 6-4, 6-5, 302; 5-3, 7-3 the AMF of the PRA.
The AMF
    defining 303A or retrieving 303B a UE Reporting Area, URA, in dependence of the RA and the PRA,
    transmitting 304, 4-11 the URA, to the UE, or
    transmitting 305, 5-8 the URA to the RAN.
An access Mobility Function, AMF in a communication network comprising a user entity, UE, a radio access node, RAN, and a core network comprising
a user plane function, UPF, communicating with a data network, DN; and
a control plane, which again comprises at least a control plane comprising the Access Mobility Function, AMF; and a Session Management Function, SMF,
the AMF being adapted for
    retrieving 301, 4-2, 5-1 or determining a registration area, RA, for the UE,
    retrieving 302, 4-5, 5-3 a presence reporting area, PRA, for the UE,
    defining 303A or retrieving 303B a UE Reporting Area, URA, in dependence of the RA and the PRA,
at least
    transmitting 304, 4-11 the URA, to the UE, or
    transmitting 305, 5-8 the URA to the RAN.
The AMF may further be
    receiving an indication 312 of direction of movement into or out of the URA of the UE,
    transmitting 4-13, 4-14, 6-13, 6-14 an indication of direction of movement into or out of the URA of the UE to the SMF or a plurality of SMF's.
For the AMF, the network may moreover comprising a PCF, an OCS and an NEF, the AMF further transmitting an indication of direction of movement into or out of the URA of the UE to at least one of the Policy Control Function, PCF, the Online Charging System, OCS and the NEF 5-10, 7-10.

A User entity, UE, in a communication network—is provided—the UE comprising a radio access node, RAN, and a core network comprising
a user plane function, UPF, communicating with a data network, DN; and
a control plane, which again comprises at least a control plane comprising the Access Mobility Function, AMF; and
a Session Management Function, SMF.

The UE is adapted for adopting
at least a CM-IDLE mode or a CM-CONNECTED mode RRC INACTIVE state, the UE also being adapted for adopting a CM-CONNECTED mode RRC ACTIVE state,
if the UE adopting a CM-IDLE mode or a CM-CONNECTED mode RRC INACTIVE state 311 and
upon the UE moving in a direction into or out of a UE Reporting Area, URA, the UE being adapted for
    reporting 312, 5-9, 4-12 or triggering a reporting 317, 7-9, 6-13 of an indication of a direction of movement into or out of the URA of the UE to the AMF.

The UE may moreover be adapted for, preceding the reporting, receiving a message 5-8, 4-11, 304 comprising the URA or a definition of the URA.

A Radio Access Node, RAN, in a communication network comprising a radio access node, and
a core network comprising
a user plane function, UPF, communicating with a data network, DN; and
a control plane, which again comprises at least a control plane comprising the Access Mobility Function, AMF; and
a Session Management Function, SMF;
the UE being adapted for adopting at least a CM-IDLE mode or a CM-CONNECTED mode RRC INACTIVE state, the UE also being adapted for adopting a CM-CONNECTED mode RRC ACTIVE state.

If the UE adopting a CM-CONNECTED mode RRC ACTIVE state
    upon the UE moving 316 in a direction into or out of a UE Reporting Area, URA, the RAN is
    reporting 317 the direction of the move of UE to the AMF.

There are provided a plurality of core network nodes, CNN's, such as a Session Management Function, Policy Control function, PCF, Online Charging System, OCS, and Network Exposure Function, NEF, function, in a communication network comprising a radio access node, RAN, and a User Entity, UE, the core network further comprising a user plane function, UPF, communicating with a data network, DN; and a control plane, which again comprises at least a control plane comprising the Access Mobility Function, AMF.

One CNN is at least being adapted for
    retrieving 4-2, 4-3, 6-2, 6-3; 5-2, 7-2 a service area such as a a TA or TAI, and—allocating a Presence Reporting Area, PRA,
    informing 4-4, 4-5, 6-4, 6-5, 302; 5-3, 7-3 the AMF of the PRA,
    receiving 4-9, 4-10, 6-9, 6-10; 5-7, 7-7 a UE location, a PRA, and a presence indication of the UE being inside or out of the PRA,
    receiving 4-13, 4-14, 6-13, 6-14 a UE location, at least one PRA and an indication of the UE moving in a direction in or out of the URA.

The URA may be defined as the overlapping or joint area of PRA and RA. The URA may further be defined by a set of cells, gNBs and/or traffic area identifiers, TAIs.

A number of methods are also provided:
Method for an Access Mobility Function, AMF in a communication network comprising a user entity, UE, a radio access node, RAN, and a core network comprising
a user plane function, UPF, communicating with a data network, DN; and
a control plane, which again comprises at least a control plane comprising the Access Mobility Function, AMF; and
a Session Management Function, SMF,
the AMF being adapted for
    retrieving 301, 4-2, 5-1 or determining a registration area, RA, for the UE,
    retrieving 302, 4-5, 5-3 a presence reporting area, PRA, for the UE,
    defining 303A or retrieving 303B a UE Reporting Area, URA, in dependence of the RA and the PRA,
at least
    transmitting 304, 4-11 the URA, to the UE, or
    transmitting 305, 5-8 the URA to the RAN.

Method for a User entity, UE, in a communication network comprising a radio access node, RAN, and a core network comprising
a user plane function, UPF, communicating with a data network, DN; and
a control plane, which again comprises at least a control plane comprising the Access Mobility Function, AMF; and
a Session Management Function, SMF;
the UE being adapted for adopting
at least a CM-IDLE mode or a CM-CONNECTED mode RRC INACTIVE state, the UE also being adapted for adopting a CM-CONNECTED mode RRC ACTIVE state,
if the UE adopting a CM-IDLE mode or a CM-CONNECTED mode RRC INACTIVE state 311 and
upon the UE moving in a direction into or out of a UE Reporting Area, URA, the UE being adapted for
    reporting 312, 5-9, 4-12 or triggering a reporting 317, 7-9, 6-13 of an indication of a direction of movement into or out of the URA of the UE to the AMF.

The UE is moreover being adapted for, preceding the reporting, receiving a message 5-8, 4-11, 304 comprising the URA or a definition of the URA.

Method for a Radio Access Node, RAN, in a communication network comprising a radio access node, and a core network comprising
a user plane function, UPF, communicating with a data network, DN; and
a control plane, which again comprises at least a control plane comprising the Access Mobility Function, AMF; and
a Session Management Function, SMF;
the UE being adapted for adopting at least a CM-IDLE mode or a CM-CONNECTED mode RRC INACTIVE state, the UE also being adapted for adopting a CM-CONNECTED mode RRC ACTIVE state,
if the UE adopting a CM-CONNECTED mode RRC ACTIVE state
    upon the UE moving 316 in a direction into or out of a UE Reporting Area, URA,
    reporting 317 the direction of the move of UE to the AMF.

Method for a Core network node, CNN, such as a Session Management Function, Policy Control function, PCF, Online Charging System, OCS, and Network Exposure Function, NEF, function, in a communication network comprising a radio access node, RAN, and a User Entity, UE, the core network further comprising a user plane function, UPF, communicating with a data network, DN; and a control plane, which again comprises at least a control plane comprising the Access Mobility Function, AMF, the CNN being adapted for retrieving 4-2, 4-3, 6-2, 6-3; 5-2, 7-2 a service area such as a TA or TAI, and—allocating a Presence Reporting Area, PRA, informing 4-4, 4-5, 6-4, 6-5, 302; 5-3, 7-3 the AMF of the PRA, receiving 4-9, 4-10, 6-9, 6-10; 5-7, 7-7 a UE location, a PRA, and a presence indication of the UE being inside or out of the PRA, receiving 4-13, 4-14, 6-13, 6-14 a UE location, at least one PRA and an indication of the UE moving in a direction in or out of the URA.

There is also provided a computer program or computer program product comprising instructions adapted for carrying out the methods according to any of above methods when run on a processor.

The invention claimed is:

1. An Access Mobility Function (AMF) in a communication network; the communication network comprising a user entity (UE), a radio access node (RAN) and a core network; the core network comprising a user plane function communicating with a data network and a control plane; the control plane comprising the AMF and a Session Management Function (SMF); the AMF comprising:
    processing circuitry;
    memory containing instructions executable by the processing circuitry whereby the AMF is operative to:
        retrieve or determine a registration area (RA) for the UE;
        retrieve a presence reporting area (PRA) for the UE;
        define or retrieve a UE Reporting Area (URA) based on the RA and the PRA, wherein the URA is defined as the overlapping or joint area of the PRA and RA; and
        transmit the URA to the UE or the RAN.

2. The AMF of claim 1, wherein the instructions are such that the AMF is operative to:
    receive an indication of direction of movement of the UE into or out of the URA;
    transmit an indication of the direction of movement to the SMF or a plurality of SMF's.

3. The AMF of claim 1:
    wherein the communication network comprises a Policy Control Function (PCF), an Online Charging System (OCS), and/or a Network Exposure Function (NEF);
    wherein the instructions are such that the AMF is operative to transmit an indication of direction of movement of the UE into or out of the URA to the PCF, OCS, and/or NEF.

4. A Radio Access Node (RAN) in a communication network; the communication network comprising a user entity (UE), the RAN, and a core network; the core network comprising a user plane function communicating with a data network and a control plane; the control plane comprising an Access Mobility Function (AMF) and a Session Management Function (SMF); wherein the UE has a plurality of states including the CM-IDLE mode, the CM-CONNECTED mode RRC INACTIVE state, and a CM-CONNECTED mode RRC ACTIVE state; the RAN comprising:
    processing circuitry;
    memory containing instructions executable by the processing circuitry whereby the RAN is operative to:
        report, in response to the UE moving in a direction into or out of a UE Reporting Area (URA) while the UE is in CM-CONNECTED mode RRC ACTIVE state, the direction of the move of UE to the AMF;
    wherein a Registration Area (RA) and a Presence Reporting Area (PRA) exist, and wherein the URA is defined as the overlapping or joint area of the PRA and the RA.

* * * * *